United States Patent [19]

Bowie et al.

[11] Patent Number: 5,856,785
[45] Date of Patent: Jan. 5, 1999

[54] COMPUTER SYSTEM HAVING CAPSLOCK ON AUDIBLE WARNING SIGNAL

[75] Inventors: Stuart S. Bowie, 1421 Downey St., Laramie, Wyo. 82070; Robert A. Bundy, Laramie, Wyo.

[73] Assignee: Stuart S. Bowie, Wallingford, Pa.

[21] Appl. No.: 767,324

[22] Filed: Dec. 16, 1996

[51] Int. Cl.[6] ................................................. G08B 21/00
[52] U.S. Cl. ...................... 340/635; 340/686; 341/22; 341/27; 400/477; 400/491.3
[58] Field of Search ................................. 340/635, 686; 341/22, 27; 400/477, 491.3

[56] References Cited

U.S. PATENT DOCUMENTS 5,034,598  7/1991  Poland ........................................ 341/27
5,212,477  5/1993  Louis .......................................... 341/27

FOREIGN PATENT DOCUMENTS 58-125133  7/1983  Japan ........................................ 341/27

OTHER PUBLICATIONS

IBM Technical Disclosure Bulletin, Aug. 1981 J.G. Axford, "Auditory Feedback of Keyboard Shift Lock", p. 1510.

IBM Technical Disclosure Bulletin, Feb. 1978 Johnson et al. "Optical Keyboard", pp. 3612–3613.

*Primary Examiner*—Edward Lefkowitz

[57] ABSTRACT

An apparatus and method for generating an audible indication during the time that a computer system has been toggled into a mode wherein all the letters of the alphabet a displayed in the upper case or the so-called capslock "ON" mode.

5 Claims, 10 Drawing Sheets

COMPUTER SYSTEM HAVING CAPSLOCK ON AUDIBLE WARNING SIGNAL

BACKGROUND OF THE INVENTION

The present invention is directed to the problem of typing on a computer keyboard when the capslock key on the keyboard is unintentionally activated, or the so-called "capslock error". Such errors occur when, due to the locking feature of the standard capslock key, successive words intended to be typed in lower case are all typed in capital letters, e.g. "ERROR" is typed when the typist intended to type "error".

The primary problem solved by the present invention occurs when the operator of the computer keyboard, having activated the capslock mode to "ON", continues to a section of the document wherein the text is not intended to be capitalized, forgetting that the keyboard has been placed in the capslock "ON" mode. Another common occurrence is when the capslock key is inadvertently touched during normal operation of the computer keyboard, thereby placing the keyboard in the capslock "ON" mode, unbeknownst to the typist. In either event, several characters or even pages of text maybe typed capitalized into the computer's word-processing program contrary to the operator's intent.

A visual indication of the capslock "ON" mode is present on most computer keyboards via a light or light emitting diode (LED), which is lit during time that capslock is "ON". Said indication is usually found in the upper right hand corner of the keyboard. Most word-processing programs also provide some sort of visual indication on the monitor or CRT that the capslock mode is "ON". One way the light can be turned "ON" in conventional keyboards is by a direct circuit connection between the capslock key and the light or LED present in the upper right hand corner of most keyboards.

Unfortunately, these visual indications are not particularly effective. The reason is that most typists, especially touch typists, do not concentrate on the monitor or keyboard while they are typing. In fact, they are trained to ignore both and concentrate on the text being transcribed. Consequently, when the capslock key is inadvertently pressed to the "ON" mode (or the operator forgets to turn the key to the "OFF" mode), the operator does not notice that many lines are typed in capital letters and must be retyped, all at substantial cost and lose of time.

It is, therefore, a principal object of this invention to provide means to alert the typist that the capslock mode is "ON" by providing an audible indication that the capslock mode has been activated. Recognizing that millions of keyboards are in place throughout the world, one embodiment of the present invention is designed as an attachment to existing keyboards. Another embodiment incorporates the invention into the circuitry of new computer keyboards. A further embodiment incorporates the invention in the design of software, or as hybrid of both hardware and software.

SUMMARY OF THE DISCLOSURE

In order to fulfill these objectives, there is provided a system which senses that the capslock mode is "ON" by detecting the presence of what may be termed the "ON" signal. Upon such detection, the system causes an oscillator to begin producing a periodic or time varying signal. This periodic signal is then amplified and applied to a suitable output device, such as a piezoelectric buzzer or a speaker, including those speakers commonly found onboard most computers. The output device produces a strongly audible tone, pulse or other sound or sounds indicating that capslock mode is "ON", thereby immediately alerting the typist that capital letters are being generated, so that the same can be turned "OFF" if lower case letters are desired.

DETAILED DESCRIPTION OF THE PREFERRED EMBODIMENT

Figure 1:
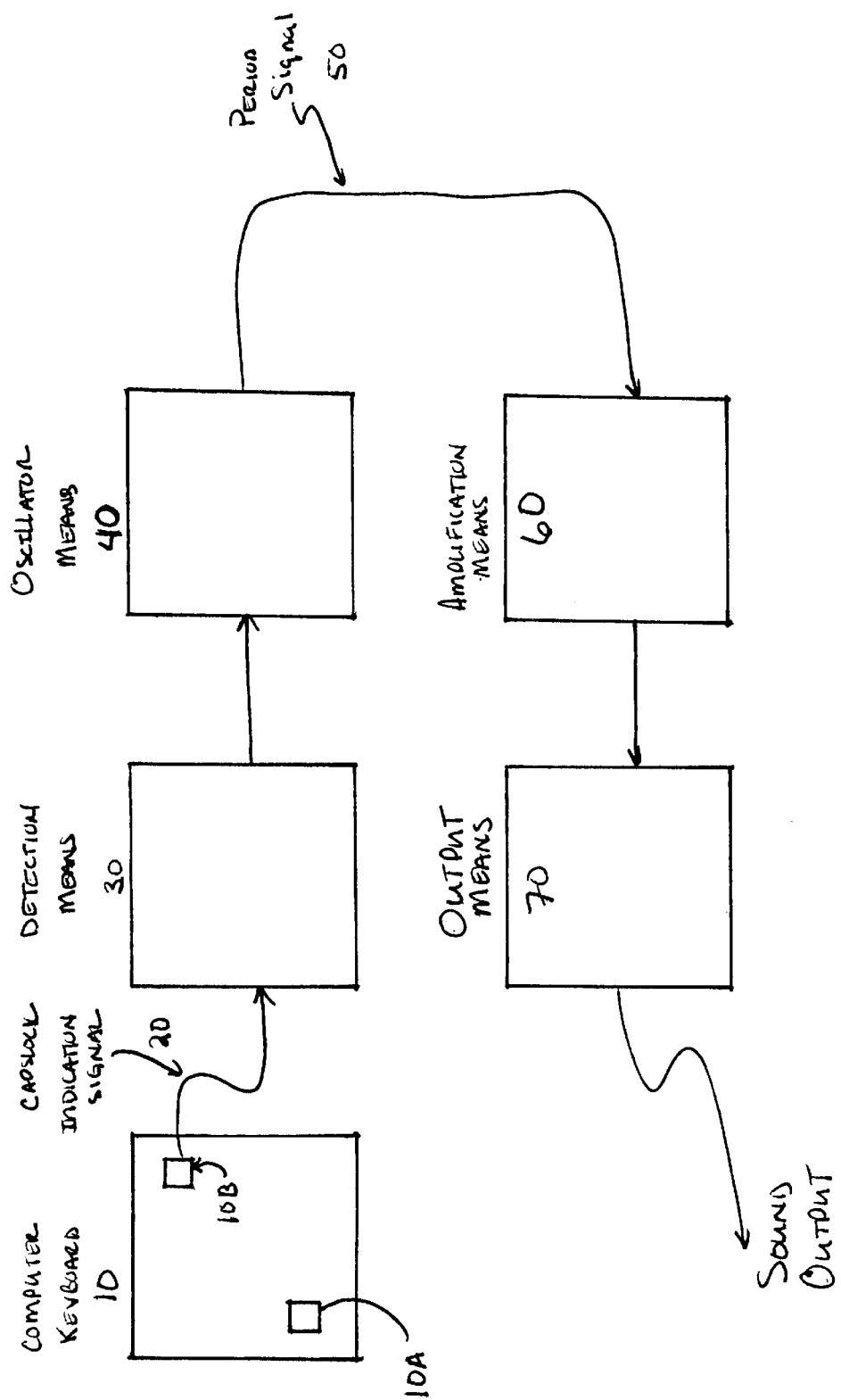
FIG. 1 is a block diagram schematically illustrating the major functional components of this invention.

FIG. 1 is a block diagram which schematically illustrates the major functional components of the capslock audible indication generation system of this invention including a computer keyboard 10, having a capslock key 10A. The computer system includes keyboard circuitry 10B which, as shown, generates a signal 20 responsive to depressing the capslock key 10A, to the "ON" position, which signal 20 is hereinafter termed the capslock indication signal. As will be discussed, the signal 20 can alternatively be generated by software to indicate that the capslock mode is "ON". Though not used on known keyboards, depressing the capslock key could just as well produce an "OFF" mode.

The audible indication generation system of this invention also includes detection means 30 for detecting said capslock indication signal 20, oscillator means 40 for generating a periodic or time varying signal 50 upon initiation by said detection means 30, and, if required, amplifier means 60 for amplifying said periodic or time varying signal to activate sound output means 70. Sound output means 70 may be a loud speaker, buzzer, chime or any other suitable means for producing a sound indication.

Figure 3:
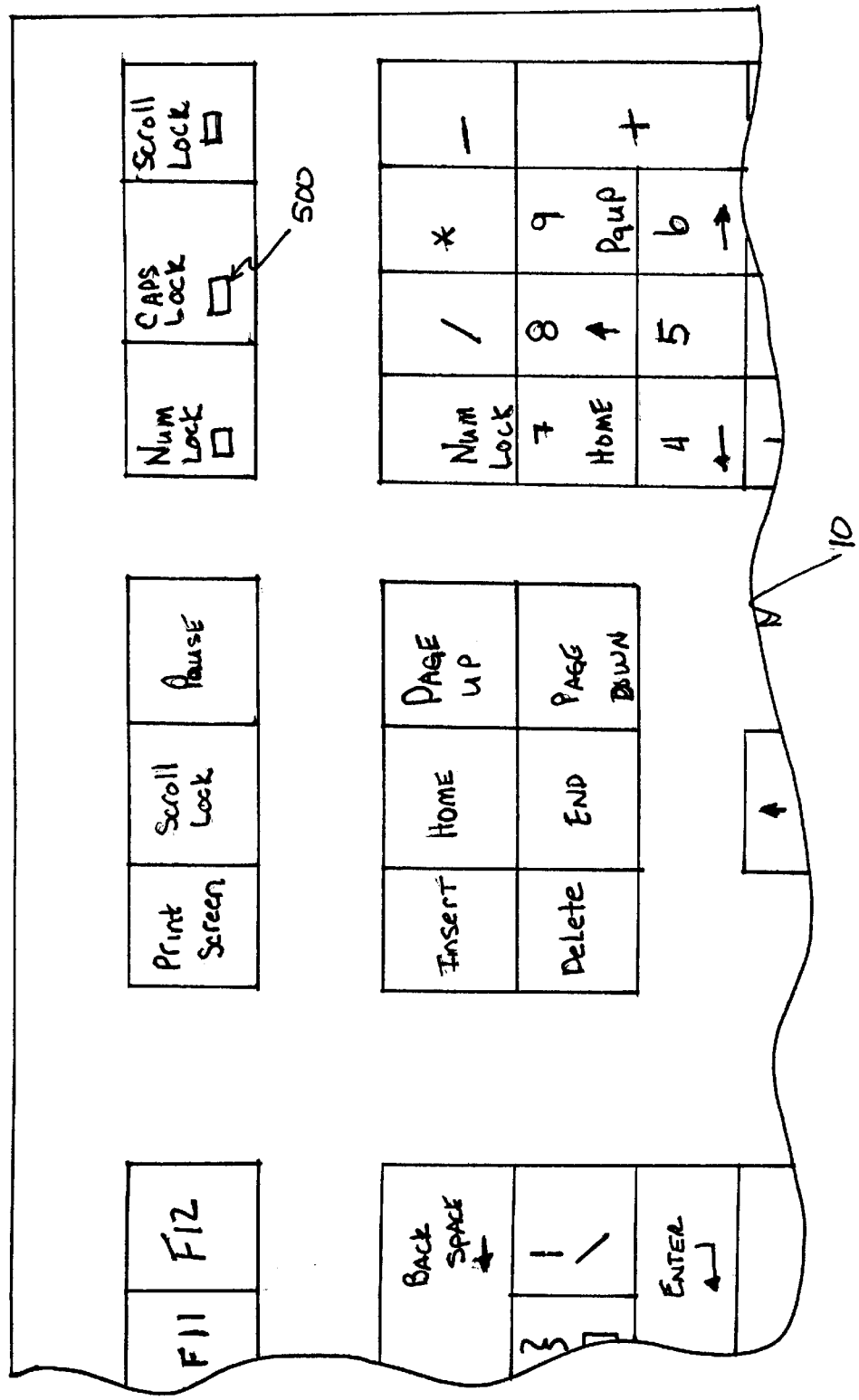
FIG. 3 is a partial view of an existing computer keyboard showing the placement of the capslock light.
Figure 4:
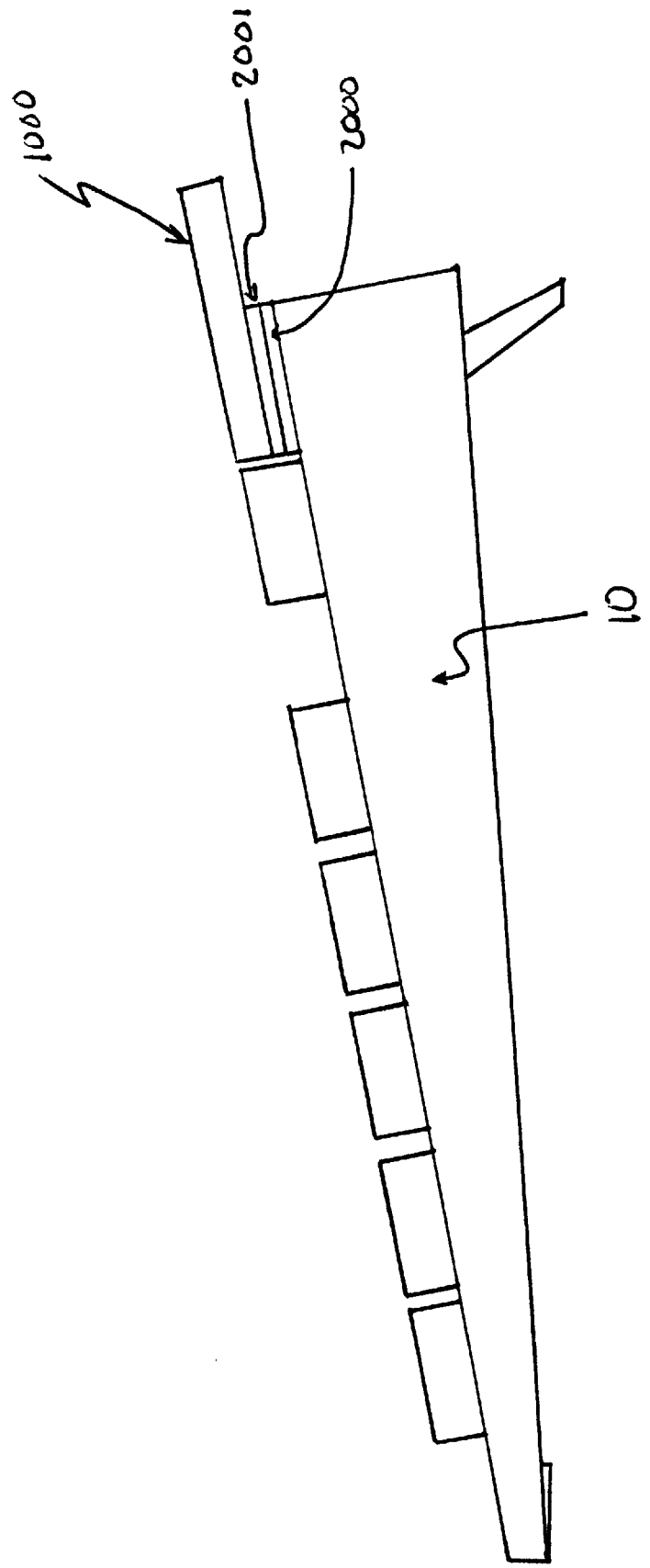
FIG. 4 is a diagram showing the side view of a representative conventional computer keyboard with the sound unit attached.
Figure 5:
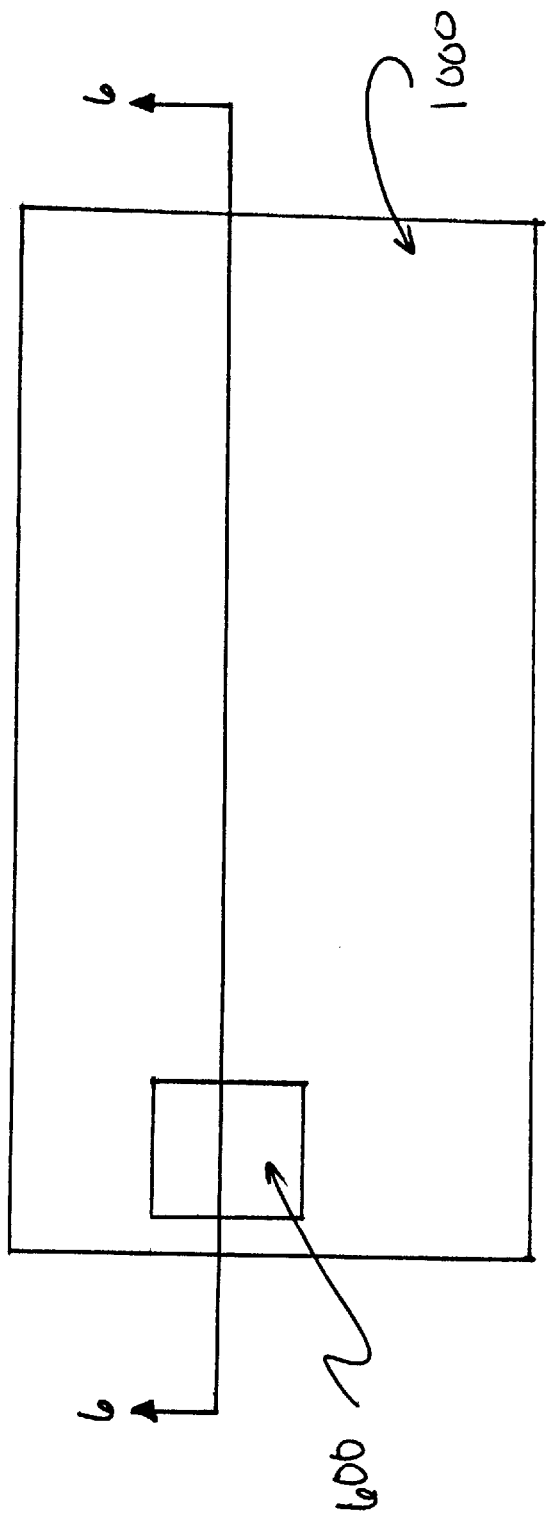
FIG. 5 is an enlarged view in elevation of the sound unit.
Figure 6:
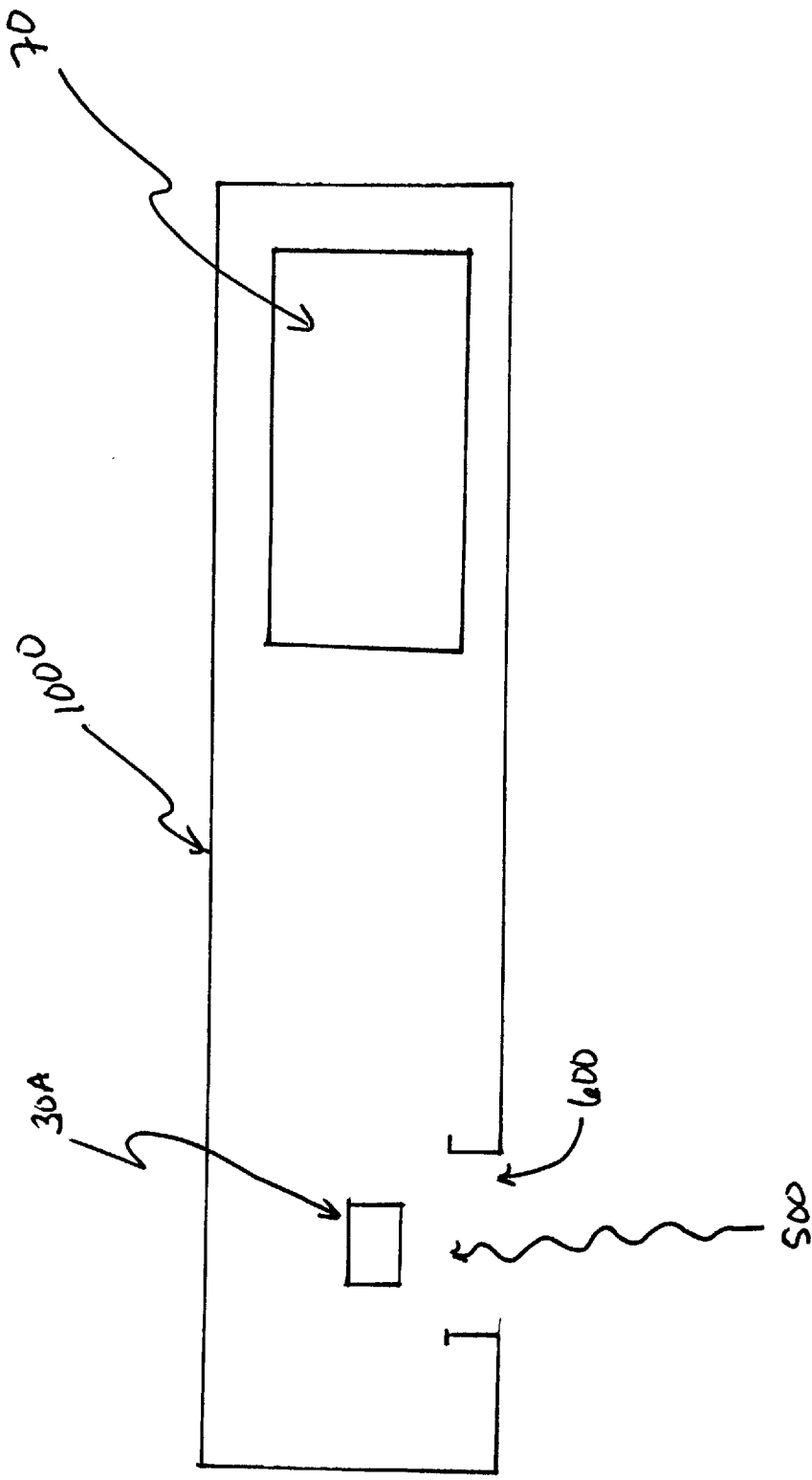
FIG. 6 is a sectional view of the sound unit along line 6—6 of FIG. 5.
Figure 7:
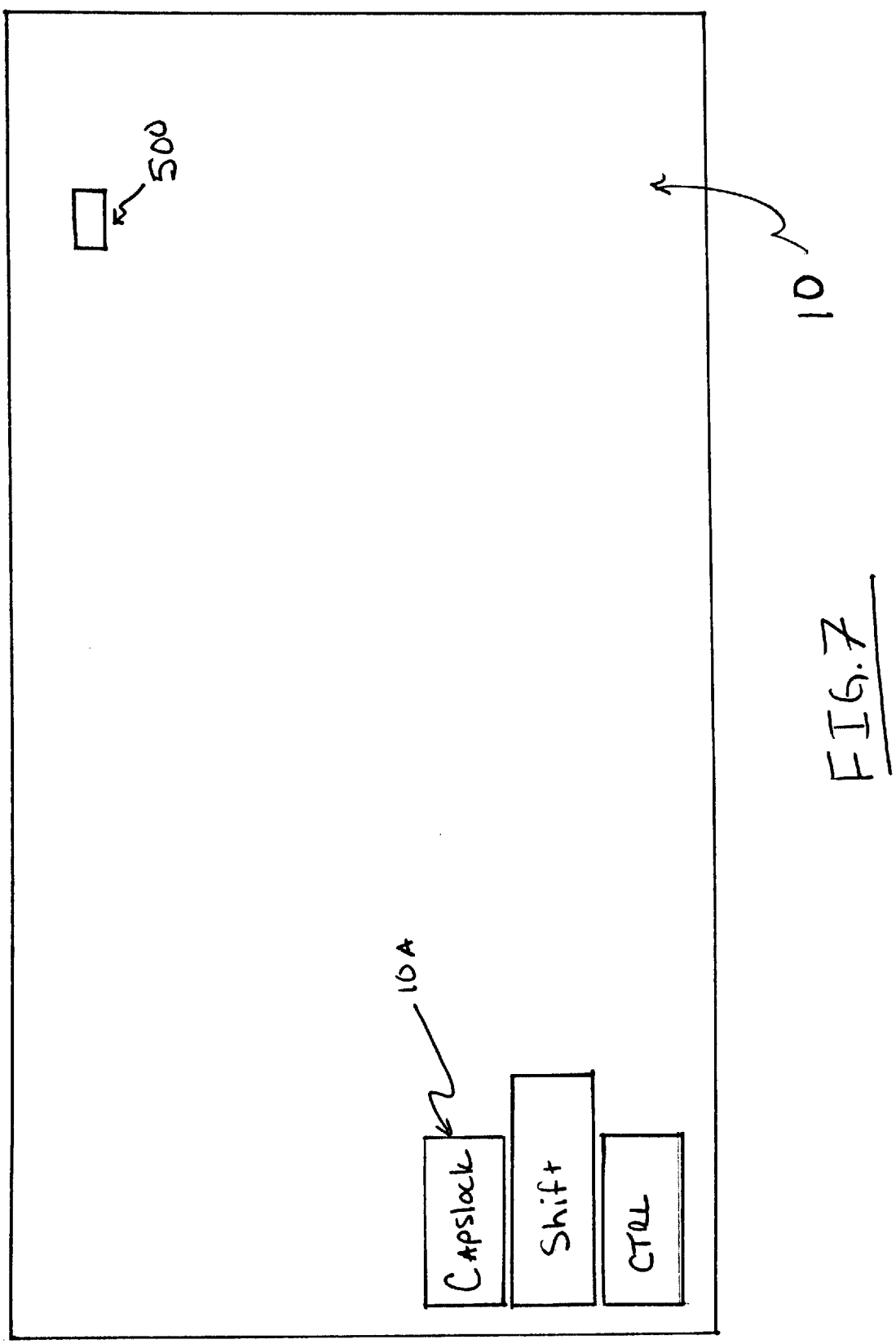
FIG. 7 is a partial plan view of an existing keyboard showing the typical relative placement of the capslock key and the capslock light.
Figure 8:
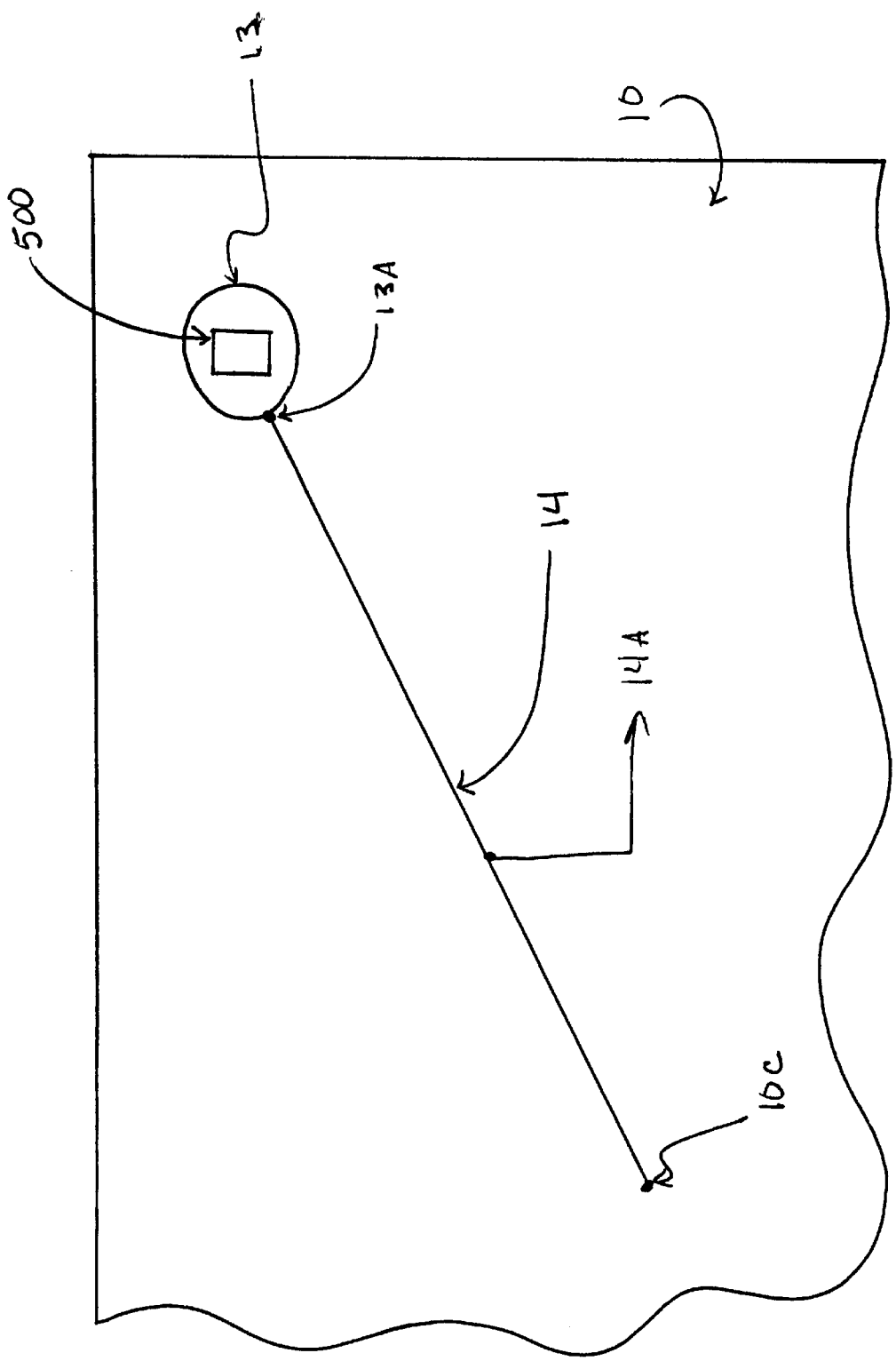
FIG. 8 is a partial view of the underside of a typical keyboard with the cover removed showing the contact point for the capslock key, the capslock light and the circuit connection between the two.

In one preferred embodiment, the components of FIG. 1 are designed specifically to produce an audible warning indication when the capslock light present on most computer keyboards is lit. Thus, as shown in FIG. 3, the capslock light 500 is the visual indicator and is a LED or other type provided by most computer keyboards. The capslock light 500 functions as the capslock indication signal 20. Preferably, a photodiode 30A is used as the detection means 30 for detecting the capslock light 500.

Figure 2:
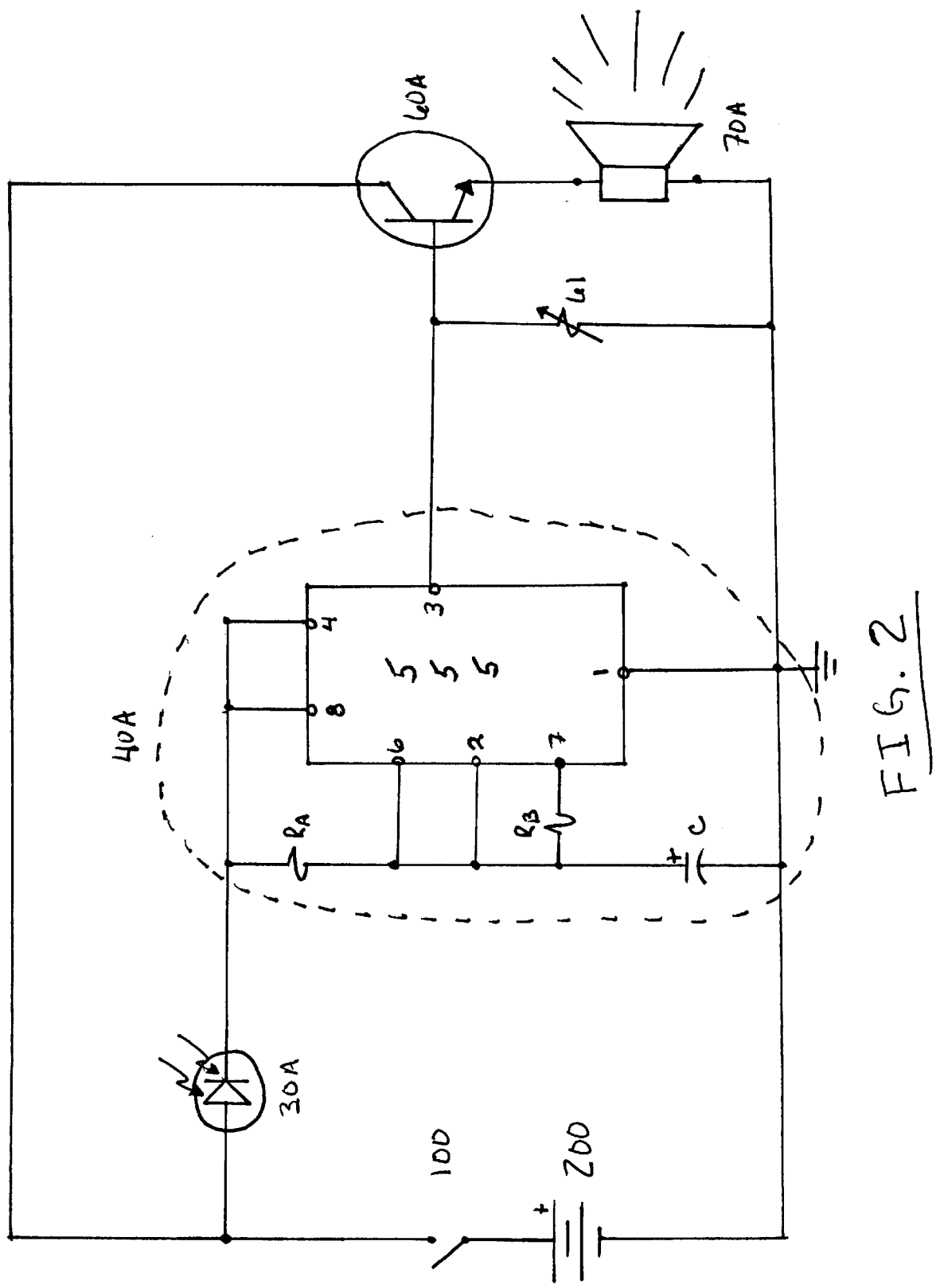
FIG. 2 is a circuit interconnection diagram of the preferred embodiment as contemplated by the inventor.

Thus, referring to FIG. 2, when the photodiode 30A is illuminated by light energy from the capslock light 500, indicating that capslock mode is "ON", the photodiode 30A will begin to conduct electricity. In the conducting state, photodiode 30A completes the circuit which powers the oscillator section of the unit 40A. The oscillator 40A, now powered, will begin to produce a periodic or time varying signal 50. Although a plurality of various oscillator circuits exist which would function an oscillator means 60, in this preferred embodiment, a 555 timer is preferably used.

Figure 2A:
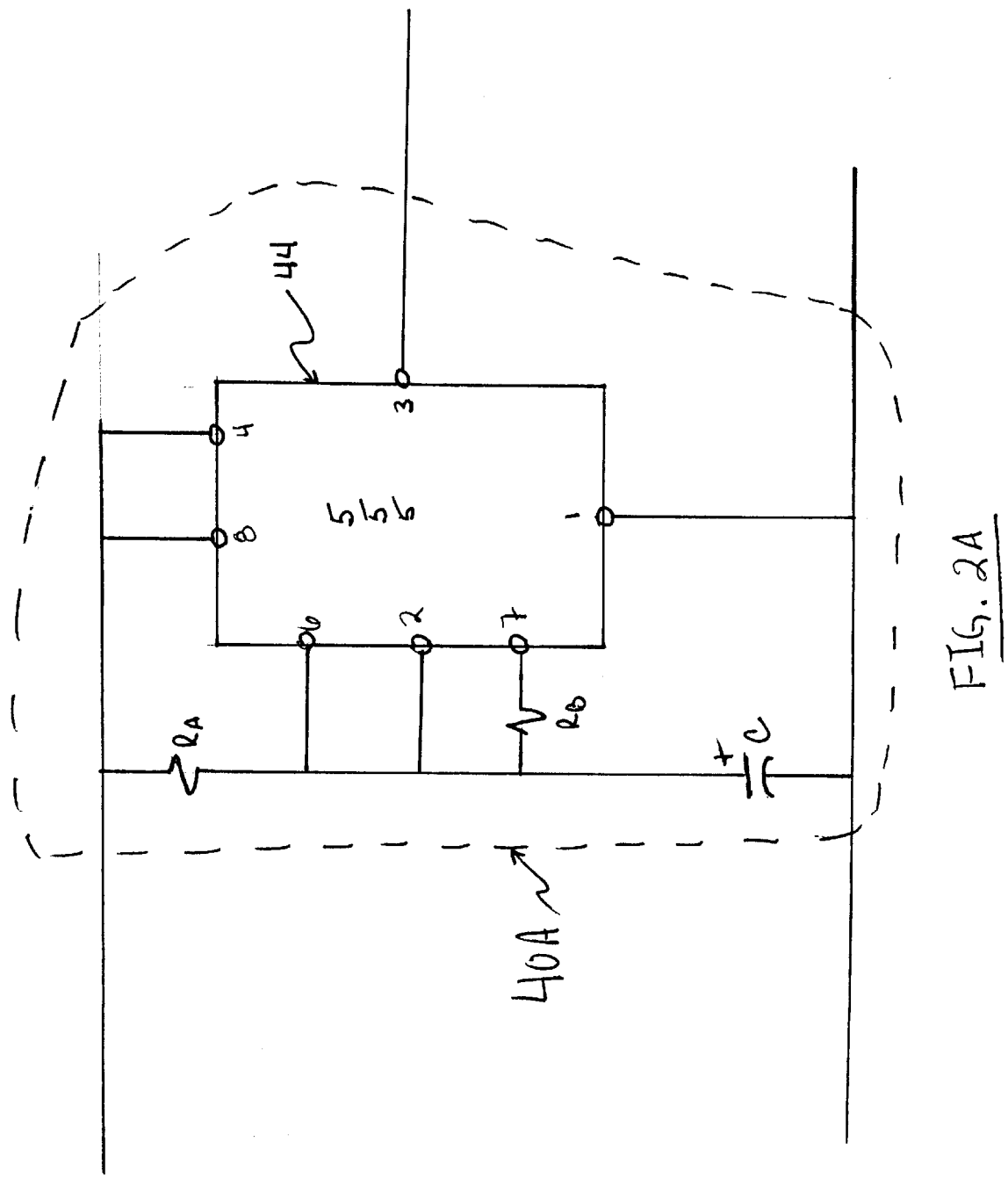
FIG. 2A is a detailed circuit interconnect diagram of the oscillator section in the preferred embodiment as contemplated by the inventor.

FIG. 2A is a schematic interconnect diagram of the oscillator 40A described in this preferred embodiment. A 555 timer 44 and its associated circuit components $R_A$, $R_B$ and C collectively comprise the oscillator 40A in this preferred embodiment. The circuit shown in FIG. 2A is well known.

Figure 2B:
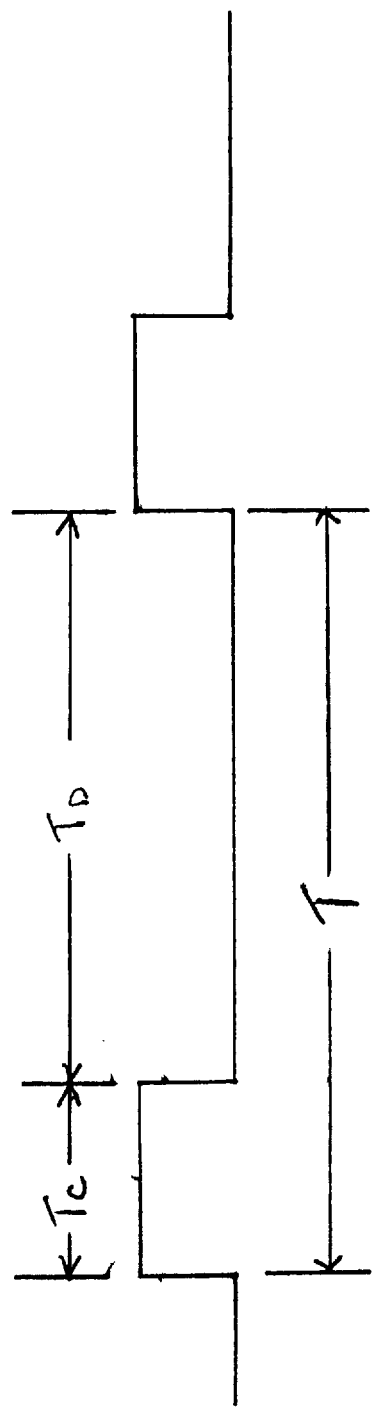
FIG. 2B is a sample output waveform from the oscillator described in FIG. 2A, the so-called periodic signal.

Referring to FIG. 2B, an example of the periodic signal 50 is shown. The output from the 555 timer is the periodic signal 50. The time period during which the periodic signal 50 is "high" is labeled $T_C$ and the time period during which that the periodic signal 50 is "low" is labeled $T_D$. Upon amplification, during the time $T_C$ the output device will make sound and during the time $T_D$ the output device will be silent.

The component values $R_A$, $R_B$ and C will vary with the desired time durations $T_C$ and $T_D$ and are calculated using the following standard design equations:

$$T_C = 0.693 R_A C, \text{ and}$$

$$TD = \{[(R_A R_B)/(R_A+R_B)]C\} ln[(2R_A-R_B)/(R_A-2R_B)]$$

From these equations, it will be obvious to any skilled in the art that $R_A$, realized as a variable resister, would function as a tone pulse length control or a pulse rate control for the convenience of the typist or operator.

The periodic signal 50 generated by the oscillator 40A is amplified by amplifier means 60. Although a plurality of various amplifier circuits exist which could function as an amplifier means 60, in this preferred embodiment, a NPN bipolar junction transistor 03JT) 60A is preferably used.

Upon receipt of the periodic signal 50 from the oscillator 40, the BJT 60A will amplify the period signal. The now amplified period signal 50 will be applied to the terminals of a sound output device 70. In the preferred embodiment, the output device is a piezoelectric buzzer 70A. During the time that the periodic signal 50 is "high" $T_C$, the piezoelectric buzzer 70A will make sound. During the time that the periodic signal 50 is "low" $T_D$, the piezoelectric buzzer 70A will not make sound.

In will be obvious to anyone skilled in the art that the addition of a variable resister, 61A to the amplifier circuit 60 between the base terminal of the NPN transistor 60A and the circuit common point will provide for the typist or operator a volume control. Such a control will allow for the operator to adjust the volume of the tone pulse or pulses, thereby providing for greater operator comfort.

In order for said photodiode 30A to effectively detect the capslock light, the photodiode 30A must be physically placed near the capslock light 500. Therefore, referring to FIG.'s 3 and 4, in the preferred embodiment, a Velcro patch 2000 is placed on the computer keyboard 10 and attached to its corresponding Velcro mate 2001 is affixed to the underside of the capslock unit 1000. This allows for placement of the capslock unit 1000 in visual proximity to the capslock light 500 present on most keyboards 10. Said Velcro patch 2000 usually includes an adhesive backing for easy attachment to any keyboard 10. However, it will be noted that any suitable attachment means can replace the Velcro attachment method described in this preferred embodiment. Such visually close placement is necessary to enable the photodiode 30A, used as the detection means in this preferred embodiment, to detect the capslock light 500.

In another preferred embodiment, the capslock audible indication generation system is hardwired into the existing keyboard circuitry 10B. In this embodiment, upon manipulation of the capslock key 10A, the existing keyboard circuitry provides the capslock "ON" signal 20 via an existing conductor means 14 in the keyboard 10. Said conductor means 14 provides and conduction path for electricity between the capslock key contact 10C and the capslock light source contact 13A. The capslock audible indication generation system detects the presence of electricity in said conductor means 14 via a hardwired connection 14A made at any point along said conductor means 14, including at said capslock key contact 10C or capslock light source contact 13A. This connection 14A then serves as the conductor means for the capslock "ON" indication signal 20. The capslock "ON" signal 20 activates the oscillator means 40 which in turn produces a periodic or time varying signal 50. This periodic or time varying signal 50 is then amplified via amplification means 60. The now amplified signal is applied to the terminals of a sound output device 70.

In yet another preferred embodiment, the capslock audible indication generation system is implemented via software. In this embodiment, the functional elements of the capslock audible indication generation system described in FIG. 1 can be incorporated in a software application running on the computer system. As such, the capslock indication signal 20 is generated by a software routine which recognizes that capslock mode is "ON". The remainder of the functional elements described in FIG. 1 would also be realized as software routines or subroutines. The sound output means would preferably include the small speaker presently included inside most computer systems. The volume control and tone pulse length controls described above would also be realized as software routines.

It will be obvious to anyone skilled the art that the detector, oscillator, amplifier, and output device and combinations thereof can be embodied in plurality of individual circuits and/or subcircuits, software routines, and/or combinations thereof, and, therefore, the claimed invention is not limited to any particular embodiment.

We claim:

1. A computer system having software means responsive to data and commands, a keyboard for the entry of said data and commands by the use of keystrokes and, said keyboard having capslock key means for switching the system between a first mode wherein letters of the alphabet are displayed in the lower case, and a second mode wherein letters of the alphabet are displayed in the upper case, said two modes being known as the capslock "OFF" and capslock "ON" modes, respectively, said computer system further including signal means for producing an activation signal indicative that the computer system is in the capslock "ON" mode, the improvement comprising:

(a) means responsive to said activation signal for producing an audible indication that the computer system is in the capslock "ON" mode; wherein said signal means includes a light on the keyboard and wherein the means for producing the audible indication includes detection means for detecting said light, said detection means being positioned adjacent to said light and including means for activating the audible indicator when the light on the keyboard is on and said light is impinging on said detection means and wherein said detection means includes a photocell, photodiode or phototransistor.

2. The invention of claim 1, wherein said means for producing an audible indication further includes means for adjusting the volume of the audible output tones or tone pulses.

3. The invention of claim 1, wherein said means for producing an audible indication further includes means for varying the time duration of the audible output tones or tone pulses.

4. In a computer keyboard having a capslock key and a light which is lit when the capslock key is placed in the "ON" position, a capslock "ON" warning device comprising: (a) sound means for producing an audible tone, and; (b) said device having photosensitive means responsive to said light for activating said sound means when the capslock key is placed in the "ON" position.

5. A computer system having software means responsive to data and commands, a keyboard for the entry of said data and commands by the use of keystrokes and, said keyboard having capslock key means for switching the system between a first mode wherein letters of the alphabet are displayed in the lower case, and a second mode wherein letters of the alphabet are displayed in the upper case, said two modes being known as the capslock "OFF" and capslock "ON" modes, respectively, wherein said software means includes means for producing an audible indication that the computer system is in the capslock "ON" mode said software means producing said audible indication only when the keyboard is in the capslock "ON" mode.

* * * * *